United States Patent
Joseph

(10) Patent No.: US 8,527,557 B2
(45) Date of Patent: *Sep. 3, 2013

(54) WRITE BEHIND CACHE WITH M-TO-N REFERENTIAL INTEGRITY

(75) Inventor: Jojo Joseph, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/434,695

(22) Filed: Mar. 29, 2012

(65) Prior Publication Data

US 2012/0191763 A1    Jul. 26, 2012

Related U.S. Application Data

(63) Continuation of application No. 12/888,030, filed on Sep. 22, 2010.

(51) Int. Cl.
*G06F 17/30* (2006.01)

(52) U.S. Cl.
USPC ............. 707/812; 711/143; 709/212

(58) Field of Classification Search
USPC .......... 707/812, E17.005, E17.044; 711/143, 711/E12.001, E12.026; 709/203, 212, 214, 709/216
See application file for complete search history.

(56) References Cited

U.S. PATENT DOCUMENTS

| | | | |
|---|---|---|---|
| 5,133,068 A * | 7/1992 | Crus et al. | 707/999.1 |
| 5,895,455 A | 4/1999 | Bellinger et al. | |
| 6,023,705 A | 2/2000 | Bellinger et al. | |
| 6,070,165 A | 5/2000 | Whitmore | |
| 6,098,075 A | 8/2000 | Becraft, Jr. et al. | |
| 6,539,396 B1 * | 3/2003 | Bowman-Amuah | 707/769 |
| 6,542,883 B1 | 4/2003 | Salo | |
| 6,571,244 B1 | 5/2003 | Larson | |
| 7,359,923 B2 | 4/2008 | Beck et al. | |
| 7,392,320 B2 * | 6/2008 | Bookman et al. | 709/231 |
| 7,421,440 B2 | 9/2008 | Pereira | |
| 7,493,333 B2 * | 2/2009 | Hill et al. | 707/999.01 |

(Continued)

OTHER PUBLICATIONS

Prabir Barooah and Joao P. Hespanha—"Graph Effective Resistance and Distributed Control: Spectral Properties and Applications"—Proceedings of the 45th IEEE Conference on Decision & Control—Manchester Grand Hyatt Hotel San Diego, CA, USA, Dec. 13-15, 2006, (pp. 3479-3485).*

(Continued)

*Primary Examiner* — John E Breene
*Assistant Examiner* — Anh Ly
(74) *Attorney, Agent, or Firm* — Lee Law, PLLC; Christopher B. Lee

(57) ABSTRACT

A batch of data records generated by at least one application for persistent storage is cached by a cache management device. At least one of the batch of data records includes at least one foreign key reference that each references one non-existent data record. It is determined that one of a group of batch database storage events has occurred. In response to one of the group of batch database storage events, it is iteratively determined which of the at least one of the batch of data records do not include the at least one foreign key reference that each references the one non-existent data record. Each of the cached batch of data records that do not include the at least one foreign key reference that each references the one non-existent data record is persisted to a database by a batch storage operation.

7 Claims, 9 Drawing Sheets

(56) References Cited

U.S. PATENT DOCUMENTS

| | | | |
|---|---|---|---|
| 7,526,534 B2 | 4/2009 | Henseler | |
| 7,673,340 B1* | 3/2010 | Cohen et al. | 726/22 |
| 7,725,495 B2 | 5/2010 | Singh | |
| 7,752,299 B2* | 7/2010 | Bookman et al. | 709/223 |
| 7,904,427 B2 | 3/2011 | Lomet | |
| 8,307,351 B2* | 11/2012 | Weigert | 717/141 |
| 2002/0059187 A1 | 5/2002 | Delo et al. | |
| 2002/0195421 A1* | 12/2002 | Srinivasan et al. | 216/38 |
| 2004/0107277 A1* | 6/2004 | Levesque et al. | 709/223 |
| 2004/0133487 A1 | 7/2004 | Hanagan et al. | |
| 2004/0193620 A1 | 9/2004 | Cheng et al. | |
| 2004/0213437 A1 | 10/2004 | Howard et al. | |
| 2006/0047717 A1* | 3/2006 | Pereira | 707/204 |
| 2006/0053099 A1* | 3/2006 | Gardner et al. | 707/3 |
| 2006/0053382 A1* | 3/2006 | Gardner et al. | 707/3 |
| 2006/0235834 A1 | 10/2006 | Blakeley et al. | |
| 2006/0252534 A1 | 11/2006 | Walker et al. | |
| 2008/0162884 A1* | 7/2008 | Kailas et al. | 712/214 |
| 2008/0263072 A1* | 10/2008 | Koskas | 707/101 |
| 2009/0055418 A1 | 2/2009 | Megerian | |
| 2009/0187582 A1 | 7/2009 | Chen et al. | |
| 2009/0198899 A1* | 8/2009 | Revanuru | 711/128 |
| 2009/0228296 A1* | 9/2009 | Ismalon | 707/E17.044 |
| 2010/0114841 A1 | 5/2010 | Holenstein et al. | |
| 2010/0268690 A1* | 10/2010 | Anderson et al. | 707/661 |
| 2011/0010344 A1* | 1/2011 | Sjogren | 707/638 |
| 2011/0126201 A1* | 5/2011 | Iyer et al. | 718/102 |
| 2011/0138123 A1 | 6/2011 | Gurajada et al. | |
| 2011/0154236 A1* | 6/2011 | Stoeck et al. | 707/E17.044 |
| 2011/0161371 A1* | 6/2011 | Thomson et al. | 707/792 |
| 2011/0246250 A1* | 10/2011 | Abraham et al. | 705/7.12 |
| 2012/0072470 A1* | 3/2012 | Joseph | 707/812 |

OTHER PUBLICATIONS

Panos Vassiliadis, Alkis Simitsis, Panos Georgantas, Manolis Terrovitis, and Spiros Skiadopoulos—"A generic and customizable frameworkfor the design of ETL scenarios"—Information Systems vol. 30, issue 7, Nov. 2005, (pp. 492-525).*

Author Unknown, Oracle In-Memory Database Cache 11g, Website/page: http://www.oracle.com/technetwork/database/options/imdb-cache/index.html, Printed from website Aug. 24, 2010, pp. 1-4, Oracle Corporation, Published on the World Wide Web.

Author Unknown, Read-Through, Write-Through, Write-Behind and Refresh-Ahead Caching, Website/page: http://coherence.oracle.com/display/COH35UG/Read-Through,+Write-Through,+Write-Behind+and+Refresh-Ahead+Caching, Printed from website Jun. 9, 2010, pp. 1-8, Oracle Corporation, Published on the World Wide Web.

Author Unknown, Oracle TimesTen In-Memory Database 11g, Website/page: http://www.oracle.com/technetwork/database/timesten/overview/index.html, Printed from website Aug. 24, 2010, pp. 1-5 Oracle Corporation, Published on the World Wide Web.

Massimo Pezzini, Distributed Caching Platforms Are Enabling Technoloov for Twenty-First Century Computing, Research Paper ID No. G00166435, Gartner, Inc., Apr. 6, 2009, pp. 1-8, Published on the World Wide Web (http://www.gartner.com).

United States Patent and Trademark Office, Office Action for U.S. Appl. No. 12/888,030, May 14, 2012, pp. 1-24, Alexandria, VA, USA.

United States Patent and Trademark Office, Office Action for U.S. Appl. No. 12/888,030, Oct. 18, 2012, pp. 1-21, Alexandria, VA, USA.

Anthony Chaves, Integrating Websphere eXtreme Scale Data Grid with Relational Database: Part 2, Website/page: http://www.packtpub.com/article/integrating-websphere-extreme-scale-data-grid-relational-database-2, Nov. 2009, pp. 1-7, Published on the World Wide Web.

Chris D. Johnson, IBM developerWorks: WebSphere eXtreme Scale Wiki Homepage, Website/page: http://www.ibm.com/developerworks/wikis/display/extremescale/Home, Aug. 6, 2010, p. 1, IBM Corporation, Published on the World Wide Web.

Author Unknown, Write-behind caching, Website/page: http://publib.boulder.ibm.com/infocenter/wxsinfo/v7r0/index.jsp?topic=/com.ibm.websphere.extremescale.over.doc/cxscchbeh.html, Printed from website Jun. 9, 2010, p. 1, IBM Corporation, Published on the World Wide Web.

Chris D. Johnson, IBM developerWorks: Write-behind caching support, Website/page: http://www.ibm.com/developerworks/wikis/display/objectgridprog/Write-behind+caching+support, May 1, 2009, p. 1, IBM Corporation, Published on the World Wide Web.

Anne MacFarland, Real-Time Enterprise IT Building Blocks—Tangosol's Coherence Clustered Data Caching, Navigator, Report ™TCG2004098, Dec. 17, 2004, pp. 1-6, The Clipper Group, Inc., Published on the World Wide Web (http://www.clipper.com/research/TCG2004098.pdf).

Author Unknown, Oracle In-Memory Database Cache 11g, Website/page: http://www.oracle.com/technetwork/ database/options/imdb-cache/index.html, Printed from website Aug. 24, 2010, pp. 1-4, Oracle Corporation, Published on the World Wide Web.

Author Unknown, Read-Through, Write-Through, Write-Behind and Refresh-Ahead Caching, Website/page: http://coherence.oracle.com/display/COH35UG/Read-Through,+Write-Through,+Write-Behind+and+Refresh-Ahead +Caching, Printed from website Jun. 9, 2010, pp. 1-8, Oracle Corporation, Published on the World Wide Web.

Author Unknown, Oracle TimesTen In-Memory Database 11g, Website/page: http://www.oracle.com/technetwork/ database/timesten/overview/index.html, Printed from website Aug. 24, 2010, pp. 1-5 Oracle Corporation, Published on the World Wide Web.

Massimo Pezzini, Distributed Caching Platforms Are Enabling Technology for Twenty-First Century Computing, Research Paper ID No. G00166435, Gartner, Inc., Apr. 6, 2009, pp. 1-8, Published on the World Wide Web (http:// www.gartner.com).

* cited by examiner

US 8,527,557 B2

WRITE BEHIND CACHE WITH M-TO-N REFERENTIAL INTEGRITY

RELATED APPLICATIONS

This application is a continuation of and claims priority to and claims the benefit of U.S. patent application Ser. No. 12/888,030 titled "WRITE BEHIND CACHE WITH M-TO-N REFERENTIAL INTEGRITY," which was filed in the United States Patent and Trademark Office on Sep. 22, 2010, and which is incorporated herein by reference in its entirety.

BACKGROUND

The present invention relates to database systems. More particularly, the present invention relates to write behind cache with M-to-N referential integrity.

Database applications process data input and data output requests associated with databases for database application users. Database applications issue queries for data and store data to databases using structured query language (SQL) operations or other interface operations. For database storage operations, multi-threaded database applications must manage sequences of database storage operations by the multiple threads to ensure that a proper sequence of database records are presented to the database for storage to avoid database errors.

BRIEF SUMMARY

A method includes caching, via a cache management device, a batch of data records generated by at least one application for persistent storage, where at least one of the batch of data records comprises at least one foreign key reference that each references one non-existent data record; determining that one of a plurality of batch database storage events has occurred; iteratively determining, in response to the one of the plurality of batch database storage events, which of the at least one of the batch of data records do not comprise the at least one foreign key reference that each references the one non-existent data record; and persisting to a database, via a batch storage operation, each of the cached batch of data records that do not comprise the at least one foreign key reference that each references the one non-existent data record.

A system includes a cache memory and a processor programmed to: cache a batch of data records generated by at least one application for persistent storage to the cache memory, where at least one of the batch of data records comprises at least one foreign key reference that each references one non-existent data record; determine that one of a plurality of batch database storage events has occurred; iteratively determine, in response to the one of the plurality of batch database storage events, which of the at least one of the batch of data records do not comprise the at least one foreign key reference that each references the one non-existent data record; and persist to a database, via a batch storage operation, each of the cached batch of data records that do not comprise the at least one foreign key reference that each references the one non-existent data record.

A computer program product includes a computer readable storage medium including a computer readable program, where the computer readable program when executed on a computer causes the computer to: cache a batch of data records generated by at least one application for persistent storage, where at least one of the batch of data records comprises at least one foreign key reference that each references one non-existent data record; determine that one of a plurality of batch database storage events has occurred; iteratively determine, in response to the one of the plurality of batch database storage events, which of the at least one of the batch of data records do not comprise the at least one foreign key reference that each references the one non-existent data record; and persist to a database, via a batch storage operation, each of the cached batch of data records that do not comprise the at least one foreign key reference that each references the one non-existent data record.

DETAILED DESCRIPTION

Figure 1:
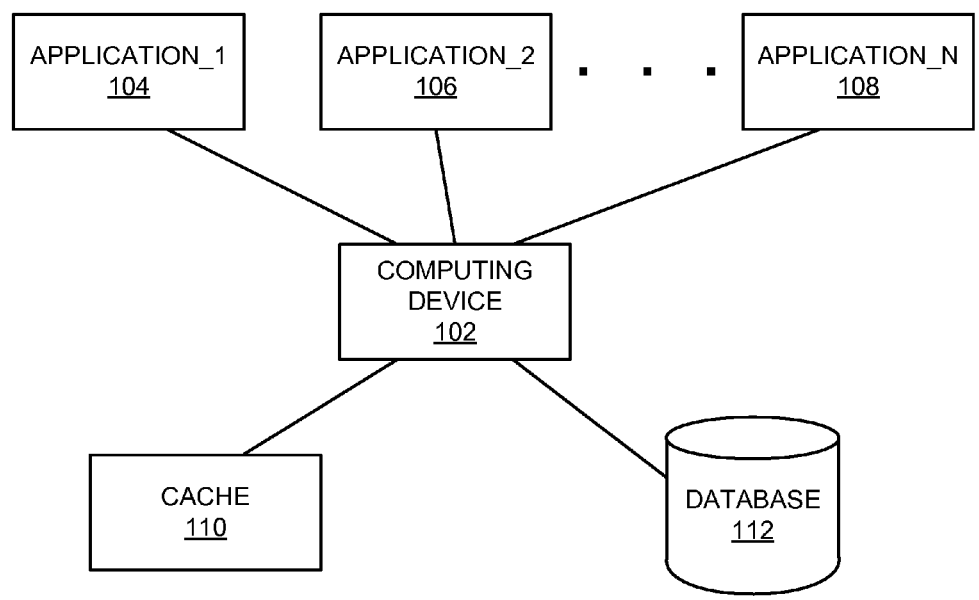
FIG. 1 is a block diagram of an example of an implementation of a system for write behind cache with M-to-N referential integrity according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides a write behind cache with M-to-N referential integrity. Write behind technology combines multiple insert, update, and delete statements from one or more applications, and commits them to a backend database as one single batch mode transaction. The present subject matter maintains referential integrity for database applications that write records into complex schemas (with M to N primary key—foreign key relationships) using a write behind cache with M-to-N referential integrity. These database applications may write primary key records and foreign key references in any sequence. The write behind cache with M-to-N referential integrity manages database record writing for these database applications so that the applications do not have to manage the overhead of ensuring that primary key records are written to the database prior to foreign key references to those records. As such, the present subject matter may reduce multi-threaded database application complexity and increase write behind cache performance for such complex schemas. For purposes of the present description, it is understood that each of the representations "M" and "N" indicate that multiple foreign key bidirectional relationships may exist between each of multiple different records. The present subject matter maintains referential integrity for these multiple different records within such complex schemas.

Many database applications have a database schema with multiple tables and foreign key constraints. Multiple threads may be used to serve client requests concurrently. In such an implementation, a thread may insert the record with a foreign key reference into a cache before a thread responsible for creating a record with the primary key inserts the data into the cache. In this situation, there is a possibility that the cache may try to commit the data to the database before the record with the primary key is available within the cache. Such an attempted write operation to the database will fail with a foreign key constraint violation. The write behind cache with M-to-N referential integrity described herein writes records to the database by iterative batch processing that ensures that primary records are written to the database prior to foreign key references. As such, the present subject matter may further reduce database write operation failures with foreign key constraint violations.

Multiple insert/update/delete statements from one or more database applications are combined. The combined statements are committed to the backend database using a batch mode transaction. Data in the cache is committed to the database either after a configurable amount of time (e.g., 200 milliseconds) or after a configurable number of records are added to the cache (e.g., 250 records), which ever happens first. This processing repeats iteratively and writes primary records to the database prior to writing foreign key references to the database during one or more batch mode transactions.

In order to ensure that referential integrity is maintained even when using write behind cache from a multithreaded application, certain management data structures are stored in association with a cache management processing module that processes data within the write behind cache for database storage according to a defined protocol for write behind cache database data updates. These data structures and protocol are described in more detail below following a description of FIG. 1 and FIG. 2.

The write behind cache with M-to-N referential integrity described herein may be performed in real time to allow prompt cache management for write behind cache implementations. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for write behind cache with M-to-N referential integrity. Within the present example, a computing device 102 hosts an application_1 104, an application_2 106, through an application_N 108. Each of the application_1 104 through the application_N 108 represent multi-threaded applications, each capable of generating and modifying data records via each of the multiple threads.

It is understood that the present example illustrates the computing device 102 hosting the application_1 104 through the application_N 108 without network interconnectivity for ease of illustration purposes. However, it is understood that the computing device 102 may include a stand-alone computer or a server interconnected via one or more networks to other computing devices that host the application_1 104 through the application_N 108. Many possible arrangements exist for application and server distribution and all are considered within the scope of the present subject matter.

A cache 110 represents a write behind cache. A database 112 provides persistent storage for cached data records. As will be described in more detail below in association with FIG. 2 through FIG. 7B, the computing device 102 provides automated write behind cache with M-to-N referential integrity. The automated write behind cache with M-to-N referential integrity is based upon iterative processing of batch mode transactions to write cached data records stored within the cache 110 to the database 112.

It should be noted that the computing device 102 may be a portable computing device, either by a user's ability to move the computing device 102 to different locations, or by the computing device 102's association with a portable platform, such as a plane, train, automobile, or other moving vehicle. It should also be noted that the computing device 102 may be any computing device capable of processing information as described above and in more detail below. For example, the computing device 102 may include devices such as a personal computer (e.g., desktop, laptop, etc.) or a handheld device (e.g., cellular telephone, personal digital assistant (PDA), email device, etc.), a server, or any other device capable of processing information as described in more detail below.

Figure 2:
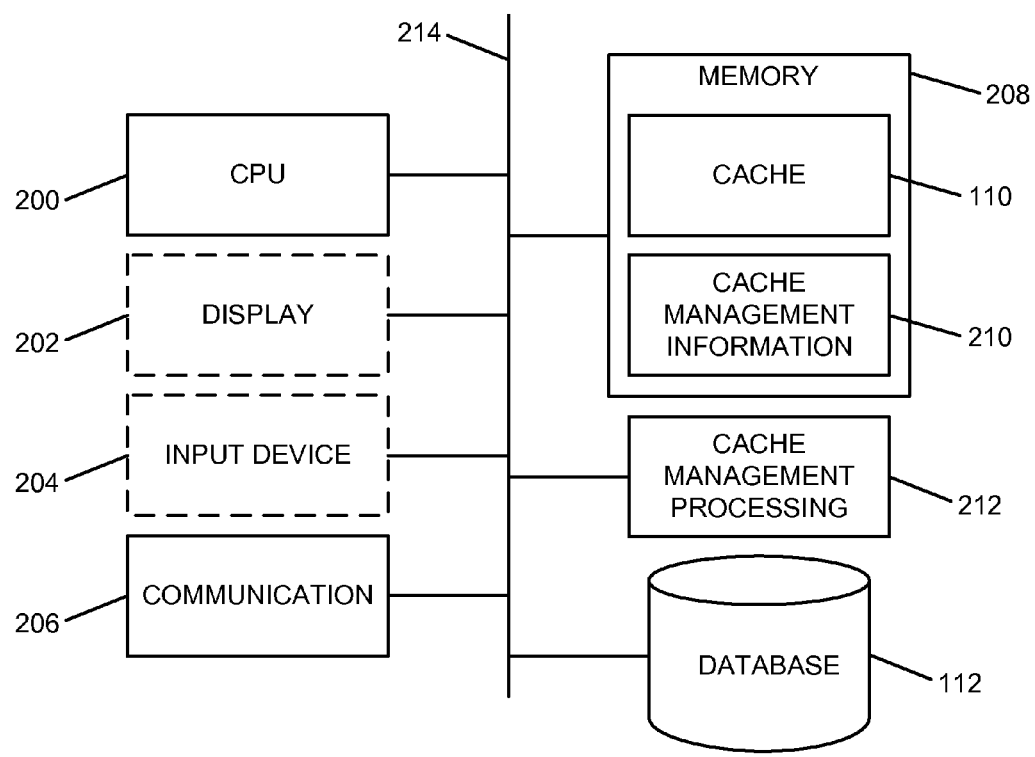
FIG. 2 is a block diagram of an example of an implementation of a computing device capable of performing automated write behind cache with M-to-N referential integrity according to an embodiment of the present subject matter.

FIG. 2 is a block diagram of an example of an implementation of the computing device 102 capable of performing automated write behind cache with M-to-N referential integrity. A central processing unit (CPU) 200 provides computer instruction execution, computation, and other capabilities within the computing device 102. A display 202 provides visual information to a user of the computing device 102 and an input device 204 provides input capabilities for the user.

The display 202 may include any display device, such as a cathode ray tube (CRT), liquid crystal display (LCD), light emitting diode (LED), projection, touchscreen, or other display element or panel. The input device 204 may include a computer keyboard, a keypad, a mouse, a pen, a joystick, or any other type of input device by which the user may interact with and respond to information on the display 202.

It should be noted that the display 202 and the input device 204 are illustrated with a dashed-line representation within FIG. 2 to indicate that they may be optional components for the computing device 102 for certain implementations. Accordingly, the computing device 102 may operate as a completely automated embedded device without user configurability or feedback. However, the computing device 102 may also provide user feedback and configurability via the display 202 and the input device 204, respectively.

A communication module 206 provides interconnection capabilities that allow the computing device 102 to communicate with other modules within the system 100, such as the application_1 104 through the application_N 108 for implementations where the respective applications are hosted via other processing platforms. The communication module 206 may include any electrical, protocol, and protocol conversion capabilities useable to provide the interconnection capabilities.

A memory 208 includes the cache 110 described above in association with FIG. 1. The cache 110 stores data records, update records, and foreign key references generated by the application_1 104 through the application_N 108. The memory 208 also includes a cache management information storage area 210 that stores data structures, such as the Cache Manager Data Structure described below within FIG. 3 and other data structures, for the computing device 102. As will be described in more detail below, cache management information stored within the cache management information storage area 210 is used to process data records stored within the cache 110 for persistent storage within the database 112.

It is understood that the memory 208 may include any combination of volatile and non-volatile memory suitable for the intended purpose, distributed or localized as appropriate, and may include other memory segments not illustrated within the present example for ease of illustration purposes. For example, the memory 208 may include a code storage area, a code execution area, and a data area without departure from the scope of the present subject matter.

A cache management processing module 212 is also illustrated. The cache management processing module 212 provides cache management processing capabilities for the computing device 102, as described above and in more detail below. The cache management processing module 212 implements the automated write behind cache with M-to-N referential integrity of the computing device 102.

Though the communication module 206 and the cache management processing module 212 are illustrated as component-level modules for ease of illustration and description purposes, it should be noted that the communication module 206 and the cache management processing module 212 may include any hardware, programmed processor(s), and memory used to carry out the respective functions of these modules as described above and in more detail below. For example, the communication module 206 and the cache management processing module 212 may include additional controller circuitry in the form of application specific integrated circuits (ASICs), processors, and/or discrete integrated circuits and components for performing communication and electrical control activities associated with the respective devices. Additionally, the communication module 206 and the cache management processing module 212 may also include interrupt-level, stack-level, and application-level modules as appropriate. Furthermore, the communication module 206 and the cache management processing module 212 may include any memory components used for storage, execution, and data processing for performing processing activities associated with the respective modules.

It should also be noted that the cache management processing module 212 may form a portion of other circuitry described without departure from the scope of the present subject matter. Further, the cache management processing module 212 may alternatively be implemented as an application stored within the memory 208. In such an implementation, the cache management processing module 212 may include instructions executed by the CPU 200 for performing the functionality described herein. The CPU 200 may execute these instructions to provide the processing capabilities described above and in more detail below for the computing device 102. The cache management processing module 212 may form a portion of an interrupt service routine (ISR), a portion of an operating system, a portion of a browser application, or a portion of a separate application without departure from the scope of the present subject matter.

The database 112 is also shown associated with the computing device 102 and provides storage capabilities for information associated with the automated write behind cache with M-to-N referential integrity of the computing device 102, as described above and in more detail below.

The CPU 200, the display 202, the input device 204, the communication module 206, the memory 208, the cache management processing module 214, and the database 112 are interconnected via an interconnection 214. The interconnection 214 may include a system bus, a network, or any other interconnection capable of providing the respective components with suitable interconnection for the respective purpose.

While the computing device 102 is illustrated with and has certain components described, other modules and components may be associated with the computing device 102 without departure from the scope of the present subject matter. Additionally, it should be noted that, while the computing device 102 is described as a single device for ease of illustration purposes, the components within the computing device 102 may be co-located or distributed and interconnected via a network without departure from the scope of the present subject matter. For a distributed arrangement, the display 202 and the input device 204 may be located at a point of sale device, kiosk, or other location, while the CPU 200, the memory 208, and the database 112 may be located at a local or remote server. Many other possible arrangements for components of the computing device 102 are possible and all are considered within the scope of the present subject matter. Accordingly, the computing device 102 may take many forms and may be associated with many platforms.

Figure 3:
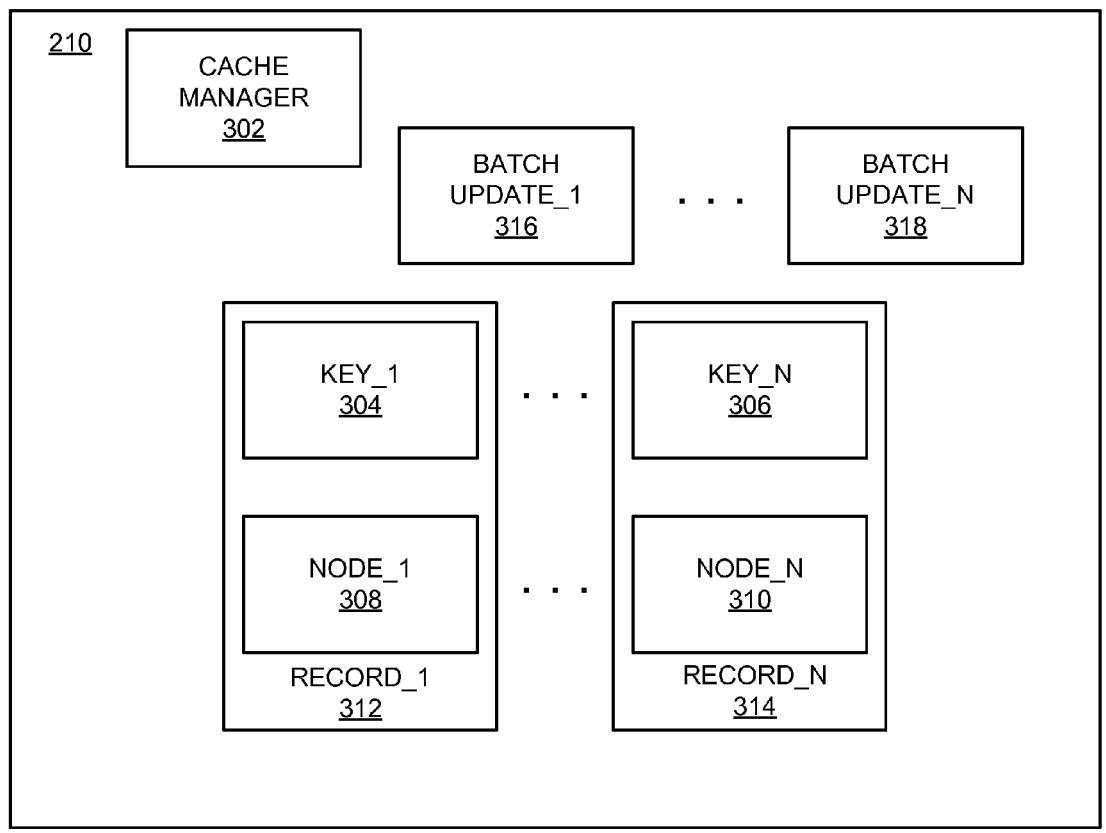
FIG. 3 is a block diagram of an example of an implementation of data structures stored within a memory used for performing automated write behind cache with M-to-N referential integrity according to an embodiment of the present subject matter.

FIG. 3 is a block diagram of an example of an implementation of data structures stored within the cache management information storage area 210 of the memory 208 used for performing automated write behind cache with M-to-N referential integrity. A cache manager data structure 302 acts as the interface used by all client applications to add/delete/update data into the cache 110. The cache manager data structure 302 maintains a graph of all records that it maintains. Each node in the graph contains a record that is to be committed to the database 112 using the write behind mechanism. Each record is uniquely identified by a key, which is an encapsulation of the primary key of that record. The cache manager data structure 302 also has one or more threads that traverse through the graph, identifying records that need to be committed to the database 112. Each identified record is removed from the graph and added to a batch-update data structure (described in more detail below). When a record is successfully committed to the database 112, it is removed from the batch-update list. However, if there is a failure in committing the record, then the record will be added back to the graph for a retry during the next iteration of the processing cycle.

For purposes of the present description, certain terminology is used with respect to primary key-foreign key relationships. A parent record is a record that contains a primary key in a relationship. A child record is a record that has a reference to the record with the primary key (a foreign reference via a foreign key relationship).

As described above, the cache manager data structure 302 is an interface exposed by the cache 110 and the cache management processing module 212 that may be used by any application, such as the application_1 104 through the application_N 108, to interact with the cache 110 (e.g., to insert, update or delete data). The cache manager data structure 302 maintains the cache data related properties of the data. The cache manager data structure 302 may be defined as a class instantiated as one entity into the cache management storage area 210 that encapsulates certain properties. All client applications, such as the application_1 104 through the application_N 108 use the single instance of the cache manager data structure 302 for the processing described herein. Client applications may obtain access to the singleton instance of the cache manager data structure 302 via any interface protocol, as appropriate for a given implementation.

Regarding the encapsulated properties of the cache manager data structure 302, a batch count represents a number of records in the cache 110 that has been reached, after which a batch database storage event may be triggered to initiate commitment of the cached data to persistent storage, such as the database 112. A default value of batch count may include, for example, two hundred (200) records. A batch interval represents a time period after which a batch database storage event may be triggered to initiate commitment of the data in the cache 110 to persistent storage, such as the database 112. A default value of the batch interval may include, for example, two hundred and fifty (250) milliseconds. It should be noted that either the batch count or the batch interval, whichever happens first, may trigger a batch database storage event.

The cache manager data structure 302 also encapsulates one or more write behind threads. These write behind threads wait for triggers of either batch count or batch interval to identify a batch database storage event. When a trigger is detected or received, the write behind thread(s) traverse through the graph (described in more detail below), and prepare the batch statements to be executed, commit the data by executing the batch statement, and notify any listener applications (e.g., any of application_1 104 through application_N 108 registered as event listeners, as described in more detail below) of any database storage failures.

The cache manager data structure 302 additionally encapsulates and maintains a data graph. The data graph maintains the cache data. One node in the data graph will be designated as the root node and any other node in the graph will have at least one path to the root node. The data graph may be implemented, for example, as a directed graph G(v, e) where the cached data is maintained or referenced, as appropriate for a given implementation. Each vertex "v" in the directed graph (except a root node) represents a record to be inserted into the database 112. The record may be identified with a primary key. An edge "e" in the directed graph represents a foreign key relationship from a child record to the parent record. For purposes of the present example, the direction of any path in the graph is from the child record to the parent record.

The cache manager data structure 302 also exposes the following operations for client applications, such as the application_1 104 through the application_N 108. An "add a record" operation allows client applications to add a record to the cache 110. Upon request by a client application to add a record to the cache 110, the record will be added to the appropriate location in the data graph maintained by cache manager data structure 302. The processing to add a record to the cache 110 will be described later.

An "update a record" operation allows client applications to update an existing record in the cache 110. Updates are maintained as additional records associated with the same node in the data graph with the same primary key as the update.

A "delete a record" operation allows the client applications to delete an existing record from the cache 110. An "add a listener" operation provides client applications an ability to request to receive notifications when a batch commit operation fails. Interested client applications may use this request to register themselves as batch update failure listeners.

With additional reference to FIG. 3, a key_1 data structure 304 through a key_N data structure 306 may each be instantiated and may each identify a record in the cache 110. For purposes of the present example, the key data structures may each be considered a primary key in the persistent store of the database 112 after the respective records are written to the database 112. A key record class from which each key data structure may be instantiated may include the following properties. A "fields" property includes a list of fields that constitute the primary key for a data record. A client application may pass this list to the cache management processing module 212 to request construction/instantiation of a key data structure. An "equality check" operation (e.g., a method) provides an equality check to determine whether two stored records have the same primary key. Two keys may be considered equal if all their fields are equal.

With further reference to FIG. 3, a node_1 data structure 308 through a node_N data structure 310 may each be instantiated and may each represent a node in the data graph and may encapsulate the parent nodes, the record, any subsequent updates or deletes to the record, and any other information appropriate for a given implementation. The properties of a node may include a "key" property that identifies the current node. The "key" identifier may be the same as the primary key of the record associated with the current node. A "parents" property includes a list of nodes that are parents to the current node. Any node that includes a parent record (a record to which this record has a foreign key relationship) will be a parent node to this node. A "children" property includes a list of child nodes. Any node that includes records that maintain a foreign key relationship with the current node will be considered a child of the current node. A child may be added, removed, and retrieved with the given key represented within the list of child nodes. An "updates" property includes a list of updates and deletes to the node with the primary key. The node class does not need to be exposed to the client applications. The record class, described below, which extends the node class, may be exposed to client applications. The record class may inherit the properties described above for the node class.

With further reference to FIG. 3, a record_1 data structure 312 through a record_N data structure 314 may each be instantiated and may each encapsulate a relational data record. The record class generalizes the node class described above. The properties of record class may include a "key" property inherited from the node class. A "parents" property may be used by a client application to request construction of a record. A client application may pass all the parent records of this record to the cache management processing module 212. If there are no parents, then the client application may pass null instead of parent identifiers. A "fields" property may include a list of fields of the current record. The "fields" property may, for example, correspond to columns in a relational record. An "SQL" property may include a structured query language (SQL) statement, formatted, for example, in Java® database connectivity (JDBC) parameterized format. The statement may be executed to persist this record to the database 112. A "retry count" property includes a number of times that this record has been attempted to be persisted. As will be described in more detail below, the "retry count" property may be used to determine when to notify a given client application registered as a listener for database failures whether a failure has occurred. A "commit flag" property indicates whether this record has already been committed to the persistent store. A "dummy flag" property is used to identify a dummy record. A dummy record may be considered a record which is created by the cache management processing module 212 (not the client application) so that the data graph may be connected in the absence of a foreign key reference during processing for one or more multi-threaded applications. Another property of the record data structures includes logic to prepare a batch update of the database 112. Processing to prepare a batch update statement will be described in more detail below.

With further reference to FIG. 3, a batch update_1 data structure 316 through a batch update_N data structure 318 may be instantiated for each batch database storage event and may maintain a collection of prepared batch update statements keyed with the SQL statement associated with the respective record(s) for which a batch update to persistent storage is to be performed. Each batch update operation also maintains a collection of records that are added to the current batch update instance, such as the batch update_1 data structure 316. Properties of the batch update class include an "instances" property by which batch updates creation is controlled. The record class instances may request instances of batch update by passing the SQL statement associated with a given record. The batch update class maintains a static collection of prepared batch update instances, such as the batch update_1 data structure 316 through the batch update_N data structure 318, keyed according to the SQL statement(s). If an instance corresponding to the SQL statement is found, then it is returned. Otherwise, a new instance of a batch update structure is created and added to the static collection and is returned. An "SQL" property includes the SQL statement for which this batch update statement is prepared. A "prepared statement" property includes the JDBC prepared statement, in response to execution of which the current batch of records is persisted to the database 112. A "list of records" property includes a list of records that are part of the current batch update. This list is maintained so that notification of database persistence failures may be forwarded to the appropriate client application(s) with complete data associated with the batch update. A "cleanup mechanism" property includes processing such that, once a batch update is committed, the prepared statement(s) may be closed and the corresponding batch update instance(s) may be removed from the static collection.

Figure 4:
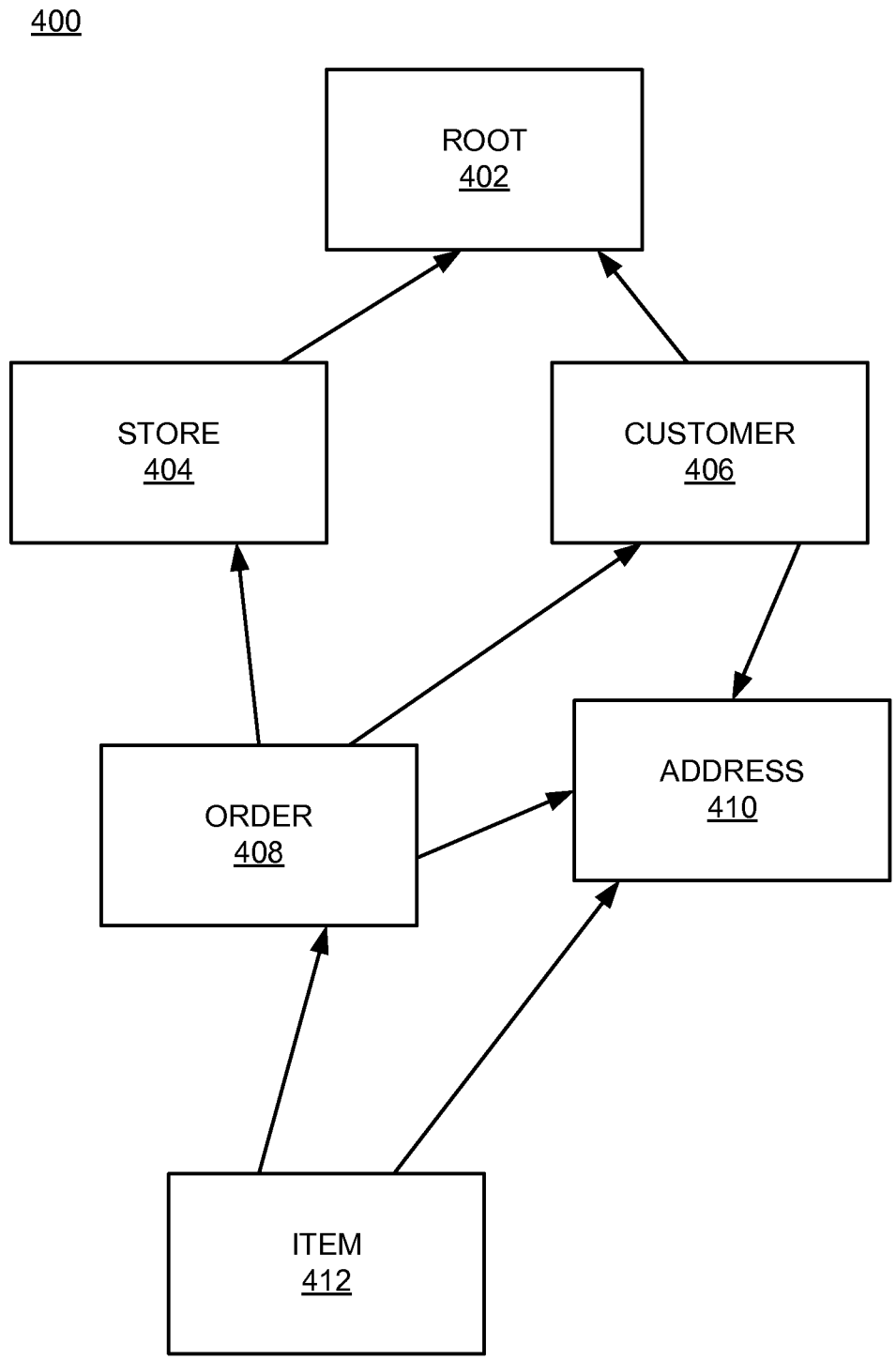
FIG. 4 is a block diagram of an example of an implementation of a directed graph that may be created within an example online order processing environment via automated write behind cache with M-to-N referential integrity according to an embodiment of the present subject matter.

FIG. 4 is a block diagram of an example of an implementation of a directed graph 400 that may be created within an example online order processing environment via automated write behind cache with M-to-N referential integrity. For purposes of the present example, it is assumed that the online order processing environment may include stores, customers, orders, items, and addresses with the following set of possible relationships:

1) Customers have one or more addresses;
2) Customers have zero or more orders;
3) Store owns the order;
4) Each order has one billing address;
5) Orders have one or more items; and
6) Each order item has one shipping address.

The example of FIG. 4 illustrates one possible implementation of elements within this example online order processing environment. It is understood that the elements of FIG. 4 are described below in terms of parent and child relationships with directional arrows to illustrate child to parent relationships. However, it should be noted that these relationships may be bi-directionally traversed and represented as foreign key references within any given element to facilitate any such traversal. These relationships are represented as the directed graph 400 with a root node instance 402 added as a root of the directed graph 400 for traversal. A store instance 404 and a customer instance 406 are each represented as children of the root node 402, as represented via the directed arrows in the directed graph 400. Similarly, an order instance 408 is shown to be a child of each of the store instance 404, the customer instance 406, and the address instance 410. An item instance 412 is shown as a child of the order instance 408 and the address instance 410. An address instance 410 is shown as a child of each of the customer instance 406, the order instance 408, and the item instance 412. For purposes of the present example, the billing address and shipping address are the same address, represented by the address instance 410. It is understood that the billing address and shipping address may be different addresses, and thus represented as different address instances within a directed graph, as appropriate for a given implementation.

For purposes of the present description, each of the store instance 404, the customer instance 406, the order instance 408, the address instance 410, and the item instance 412 represent vertexes of the directed graph 400. Each arrow illustrated within the directed graph 400 represents an edge.

The following example pseudo code illustrates an example encoding by which the directed graph 400 may be created.

```
int storied=100;
Store store=new Store(storeId, null);
Store.setSql("insert into STORE values ?, ?, ?");
Customer cust=new Customer(10001, null);
Address addr=new Address(1, cust);
int orderId=999;
Order order=new Order(orderId, cust, store);
Order.setBillingAddress( . . . );
OrderItem item=new OrderItem(1, order);
Item.setShippingAddress( . . .);
```

As can be seen from the above example pseudo code, a new store instance, such as the store instance 404, with a store identifier of one hundred (100) may be created. Specific SQL statements may be set for the store record. A new customer instance, such as the customer instance 406, may be created along with a new address instance, such as the address instance 410, for that customer. A new order instance, such as the order instance 408, may be created. A billing address may be set for the order that may include the new address instance. A new order item instance, such as the item instance 412, may also be created and a shipping address may be set that may include the new address instance.

To persist the above-described records from an application level to the cache 110, the following example pseudo code may be processed, for example, via one of the application_1 104 through the application_N 108.

```
CacheManager cache=CacheManager.getInstance( );
cache.addRecord(store);
``` cache.addRecord(cust);
cache.addRecord(addr);
cache.addRecord(order);
cache.addRecord(item);

As can be seen from this example pseudo code, a cache manager instance may be obtained and the respective instances described in association with FIG. 4 and the first example pseudo code above, may be added to the cache by the respective application. The processing for persisting the added records to a database, such as the database 112, by a cache processing module, such as the cache management processing module 212, will be described in more detail below.

FIG. 5 through FIG. 7B below describe example processes that may be executed by devices, such as the computing device 102, to perform the automated write behind cache with M-to-N referential integrity associated with the present subject matter. Many other variations on the example processes are possible and all are considered within the scope of the present subject matter. The example processes may be performed by modules, such as the cache management processing module 212 and/or executed by the CPU 200, associated with such devices. It should be noted that time out procedures and other error control procedures are not illustrated within the example processes described below for ease of illustration purposes. However, it is understood that all such procedures are considered to be within the scope of the present subject matter.

Figure 5:
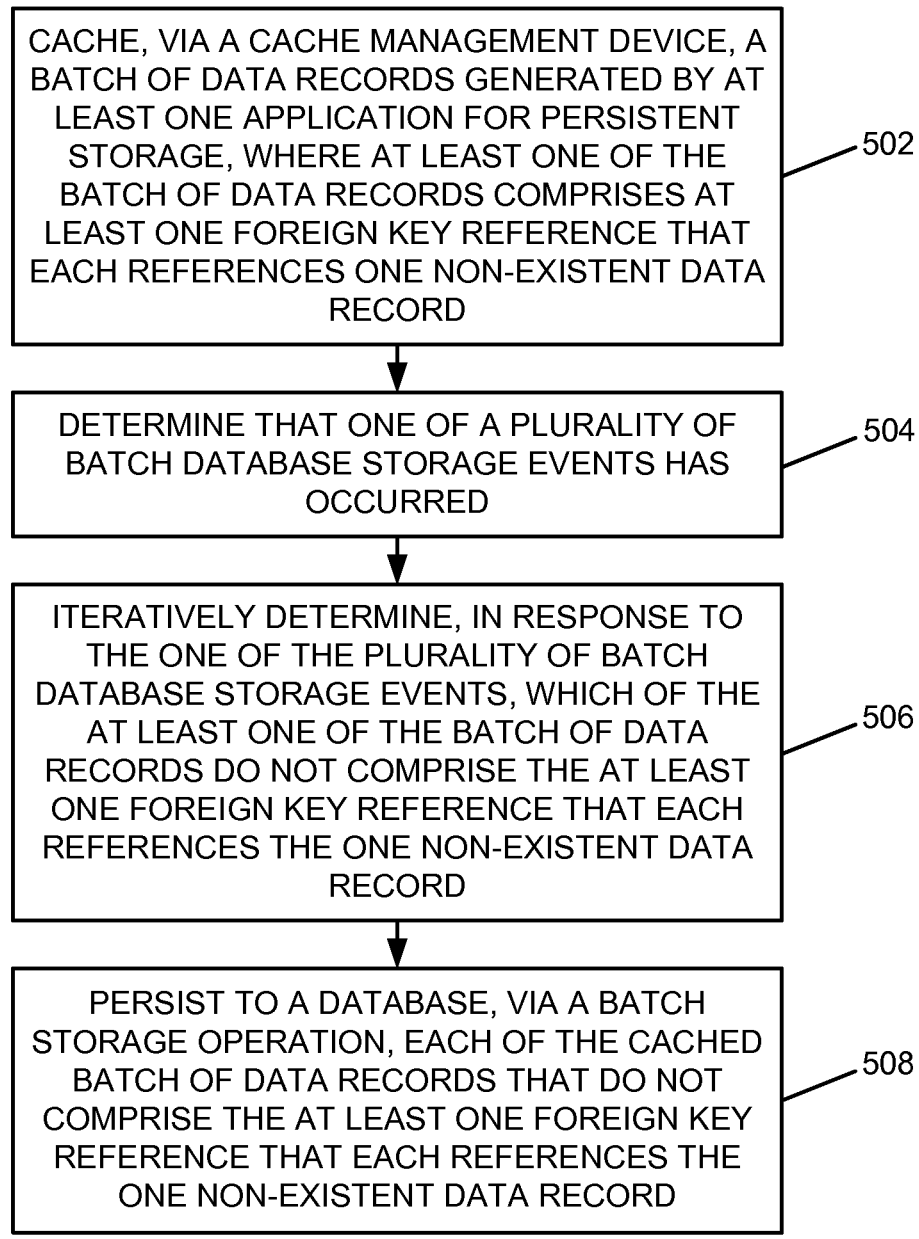
FIG. 5 is a flow chart of an example of an implementation of a process for automated write behind cache with M-to-N referential integrity according to an embodiment of the present subject matter.

FIG. 5 is a flow chart of an example of an implementation of a process 500 for automated write behind cache with M-to-N referential integrity. At block 502, the process 500 caches, via a cache management device, a batch of data records generated by at least one application for persistent storage, where at least one of the batch of data records comprises at least one foreign key reference that each references one non-existent data record. At block 504, the process 500 determines that one of a plurality of batch database storage events has occurred. At block 506, the process 500 iteratively determines, in response to the one of the plurality of batch database storage events, which of the at least one of the batch of data records do not comprise the at least one foreign key reference that each references the one non-existent data record. At block 508, the process 500 persists to a database, via a batch storage operation, each of the cached batch of data records that do not comprise the at least one foreign key reference that each references the one non-existent data record.

Figure 6A:
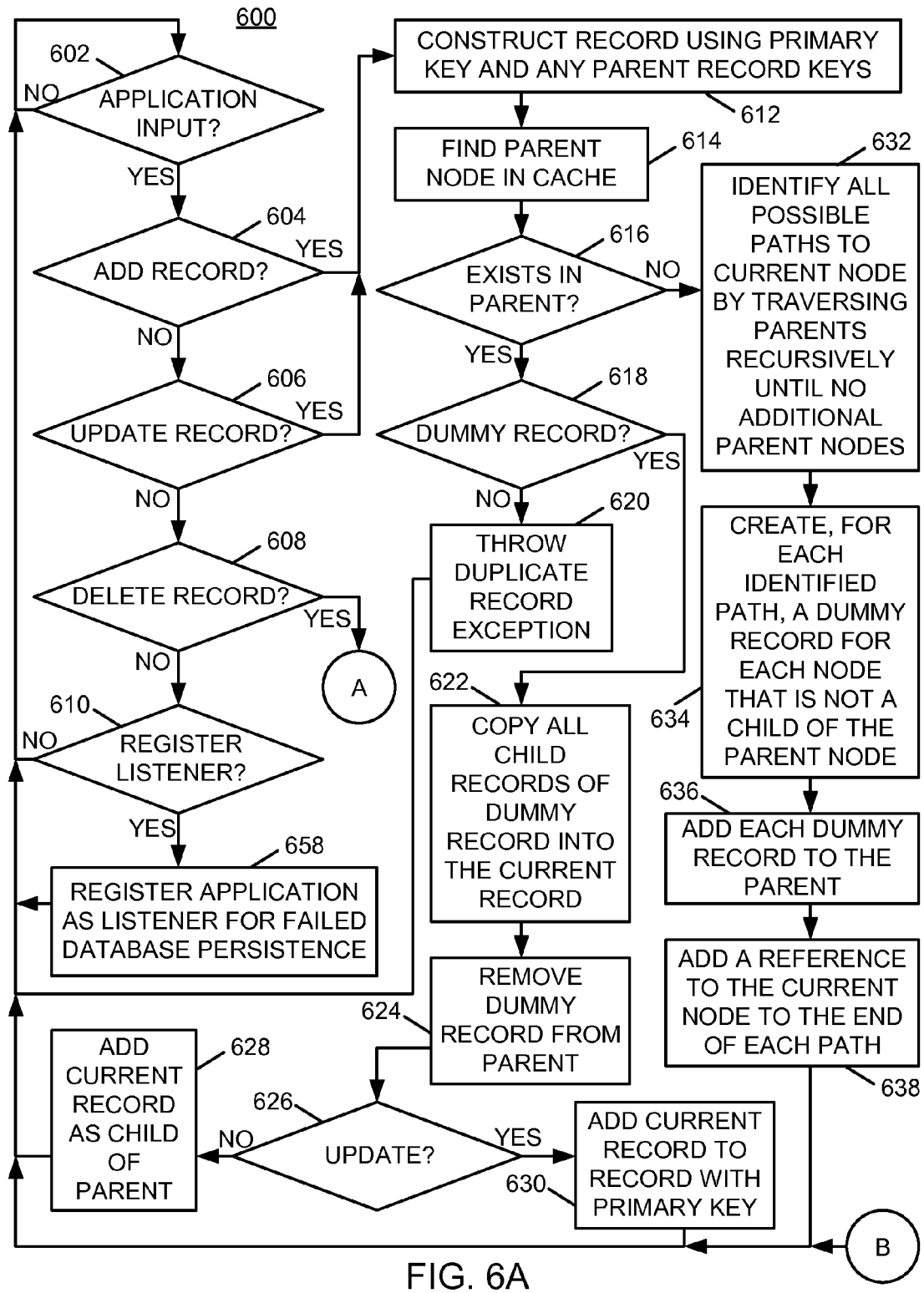
FIG. 6A is a flow chart of an example of initial processing of an implementation of process for automated write behind cache with M-to-N referential integrity in response to application record inputs according to an embodiment of the present subject matter.
Figure 6B:
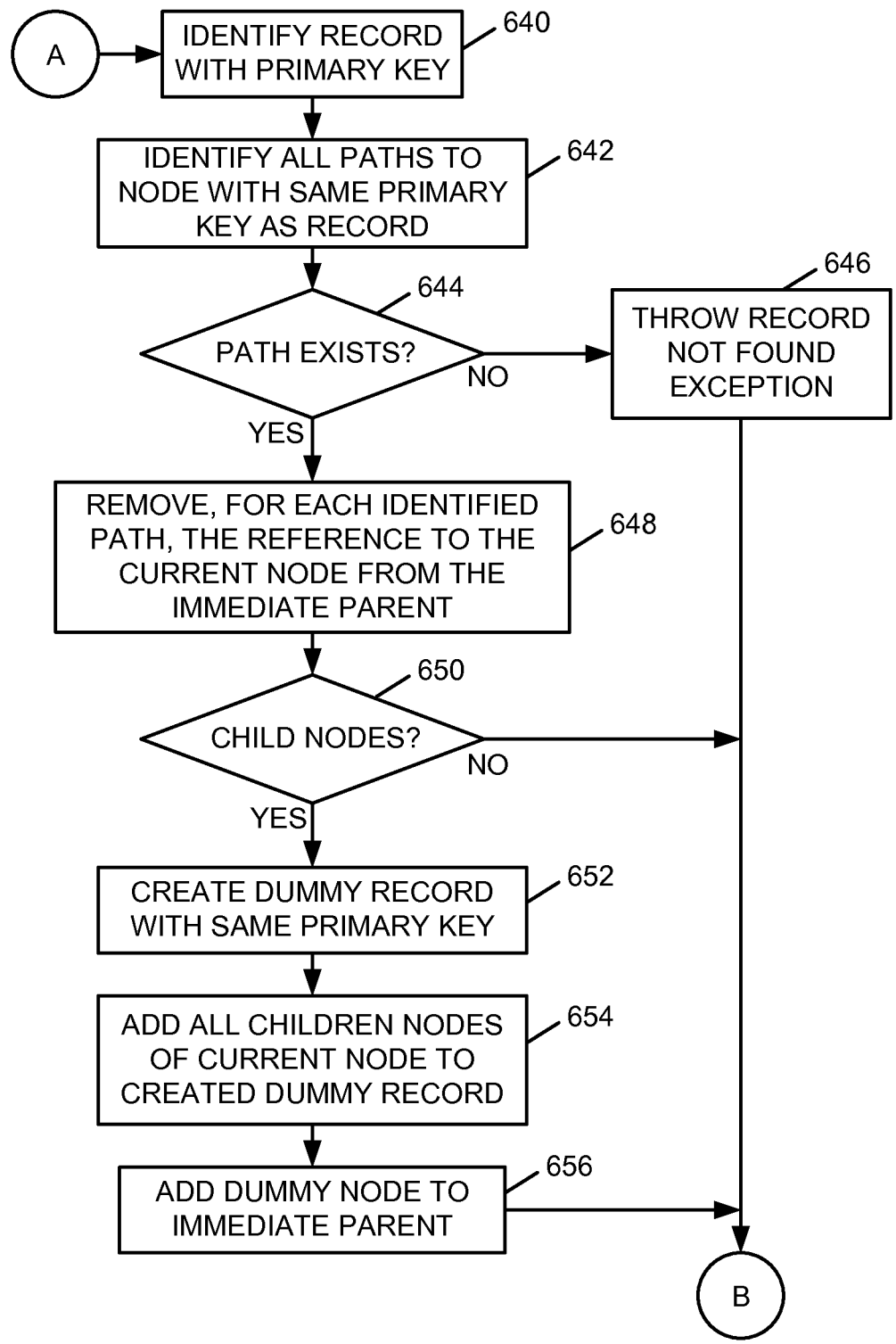
FIG. 6B is a flow chart of an example of additional processing of an implementation of process for automated write behind cache with M-to-N referential integrity in response to application record inputs according to an embodiment of the present subject matter.

FIGS. 6A-6B illustrate a flow chart of an example of an implementation of process 600 for automated write behind cache with M-to-N referential integrity in response to application record inputs. FIG. 6A illustrates initial processing within the process 600. At decision point 602, the process 600 makes a determination as to whether any application input has been detected. As described above, application input may be received from one or more multi-threaded applications. In response to determining that an application input has been detected, the process 600 begins processing to determine which type of application input has been detected. Higher level processing will be described initially, followed by a detailed description of processing associated with each application input type associated with the present example.

At decision point 604, the process 600 makes a determination as to whether the application input was a request to add a record to the cache 110. In response to determining that the application input was not a request to add a record to the cache 110, the process 600 makes a determination at decision point 606 as to whether the application input was a request to update a record within the cache 110. In response to determining that the application input was not a request to update a record within the cache 110, the process 600 makes a determination at decision point 608 as to whether the application input was a request to delete a record from the cache 110. In response to determining that the application input was not a request to delete a record from the cache 110, the process 600 makes a determination at decision point 610 as to whether the application input was a request to register the application as a listener for failed database write error notifications. In response to determining that the application input was not a request to register the application as a listener for failed database write error notifications, the process 600 returns to decision point 602 to await another application input. As such, for purposes of the present example, application requests to add records, update records, delete records, and register as a listener for failed database write error notifications will be considered. It is understood that additional processing may be performed as appropriate for a given implementation and that any such additional processing is considered within the scope of the present subject matter.

Returning to the description of decision point 604, in response to determining that the application input was a request to add a record to the cache 110, the process 600 constructs a record using a primary key and any parent record keys received from the application in association with the request to add the record at block 612. Construction of the record for each data record of the batch of data records may include storing an associated structured query language (SQL) statement generated by the application that generated each data record. It is understood that any such parent record keys may include records to which the record associated with the primary key maintains a foreign key relationship. It should be noted that if there are no known parent records, a null value may be received from the application.

At block 614, the process 600 finds the parent node in the cache 110. For purposes of the present description, the cache 110 stores a cached batch of data records, and data record updates. Further, as described above, the cache 110 may be maintained as a bidirectional directed graph with each data record represented as a node within the bidirectional directed graph. Each vertex "v" in the bidirectional directed graph other than a root node represents one of a plurality of parent records and one a plurality of child records to be persisted to the database 112. Each edge "e" in the bidirectional directed graph represents a foreign key directional relationship from one child record to one associated parent record.

At decision point 616, the process 600 makes a determination as to whether a record with the primary key exists in any parent as a child node within the cache 110. In response to determining that a record with the primary key exists as a child in any identified parent as a duplicate child node, a determination is made at decision point 618 as to whether the duplicate child node is a dummy record. In response to determining that the duplicate child node is not a dummy record, the process 600 throws a duplicate record exception at block 620. The process 600 then returns to decision point 602 and iterates as described above. It is understood that any application that is registered as a listener, as described in more detail below, may be notified of the duplicate record exception.

Returning to the description of decision point 618, in response to determining that the duplicate child node is a dummy record, the process 600 copies all child records of the dummy record into the current record at block 622. At block 624, the process 600 removes the dummy record from the parent. As such, in response to caching a data record with a primary key that matches the dummy record, the dummy record is removed from the cache 110.

At decision point 626, the process 600 makes a determination as to whether the current record is an update record. In response to determining that the current record is not an update record, the process 600 adds the current record as a child of the identified parent at block 628 and returns to decision point 602 and iterates as described above. In response to determining at decision point 626 that the current record is an update record, the process 600 adds the current record to the record with the primary key at block 630 and returns to decision point 602 and iterates as described above.

Returning to the description of decision point 616, in response to determining that the record with the primary key does not exist in any parent, the process 600 identifies all possible paths to the current node by traversing parents recursively until no additional parent nodes are identified or found at block 632. At block 634, the process 600 creates, for each identified path, a dummy record for each node that is not a child of the parent node. For purposes of the present description, it is understood that each node that is not a child of the parent node represents a non-existent data record. As such, the process 600 creates a dummy record in the cached batch of data records for each of the at least one foreign key reference that each references the one non-existent data record. At block 636, the process 600 adds each created dummy record to the parent node. At block 638, the process 600 adds a reference to the current node to the end of each identified path. The process 600 returns to decision point 602 to await another application input.

Returning to the description of decision point 606, in response to determining that the application input is a request to update a record, the process 600 returns to block 612 and iterates as described above. Returning to the description of decision point 608, in response to determining that the application input is a request to delete a record from the cache 110, the process 600 transitions to the processing shown and described in association with FIG. 6B.

FIG. 6B illustrates additional processing associated with the process 600 for automated write behind cache with M-to-N referential integrity in response to application record inputs. At block 640, the process 600 identifies a record with the primary key associated with the request to delete a record from the cache 110. At block 642, the process 600 identifies all paths to the node with the same primary key as the record. At decision point 644, the process 600 makes a determination as to whether any paths exist to the node with the same primary key as the record. In response to determining that no path exists, the process 600 throws a record not found exception at block 646 and returns to the processing described in association with FIG. 6A at decision point 602 to await a new application input. It is again understood that any application that is registered as a listener may be notified by the exception. In response to determining at decision point 644 that at least one path exists to the node with the same primary key as the record, the process 600 removes, for each identified path, the reference to the current node from the immediate parent at block 648.

At decision point 650, the process 600 makes a determination as to whether any child nodes are associated with the current node. In response to determining that no child nodes are associated with the current node, the process 600 returns to the processing described in association with FIG. 6A at decision point 602 to await a new application input. In response to determining at decision point 650 that at least one child node exists in association with the current node, the process 600 creates a dummy record with the same primary key at block 652. At block 654, the process 600 adds all children nodes of the current node to the created dummy record. At block 656, the process 600 adds the dummy node to the immediate parent node. The process 600 then returns to the processing described in association with FIG. 6A at decision point 602 to await a new application input.

Returning to the description of decision point 610 within FIG. 6A, in response to determining that the application input is a request to register the application as a listener for failed database persistence events, the process 600 registers the application as a listener at block 658. The process 600 returns to decision point 602 to await a new application input and iterates as described above.

As such, the process 600 processes application inputs to add records to a cache, to update records within the cache, to delete records from the cache, and processes registration requests for applications to become listeners. As described above, additional processing may be associated with a process, such as the process 600, for automated write behind cache with M-to-N referential integrity in response to application record inputs as appropriate for a given implementation, and any such additional processing is considered within the scope of the present subject matter.

Figure 7A:
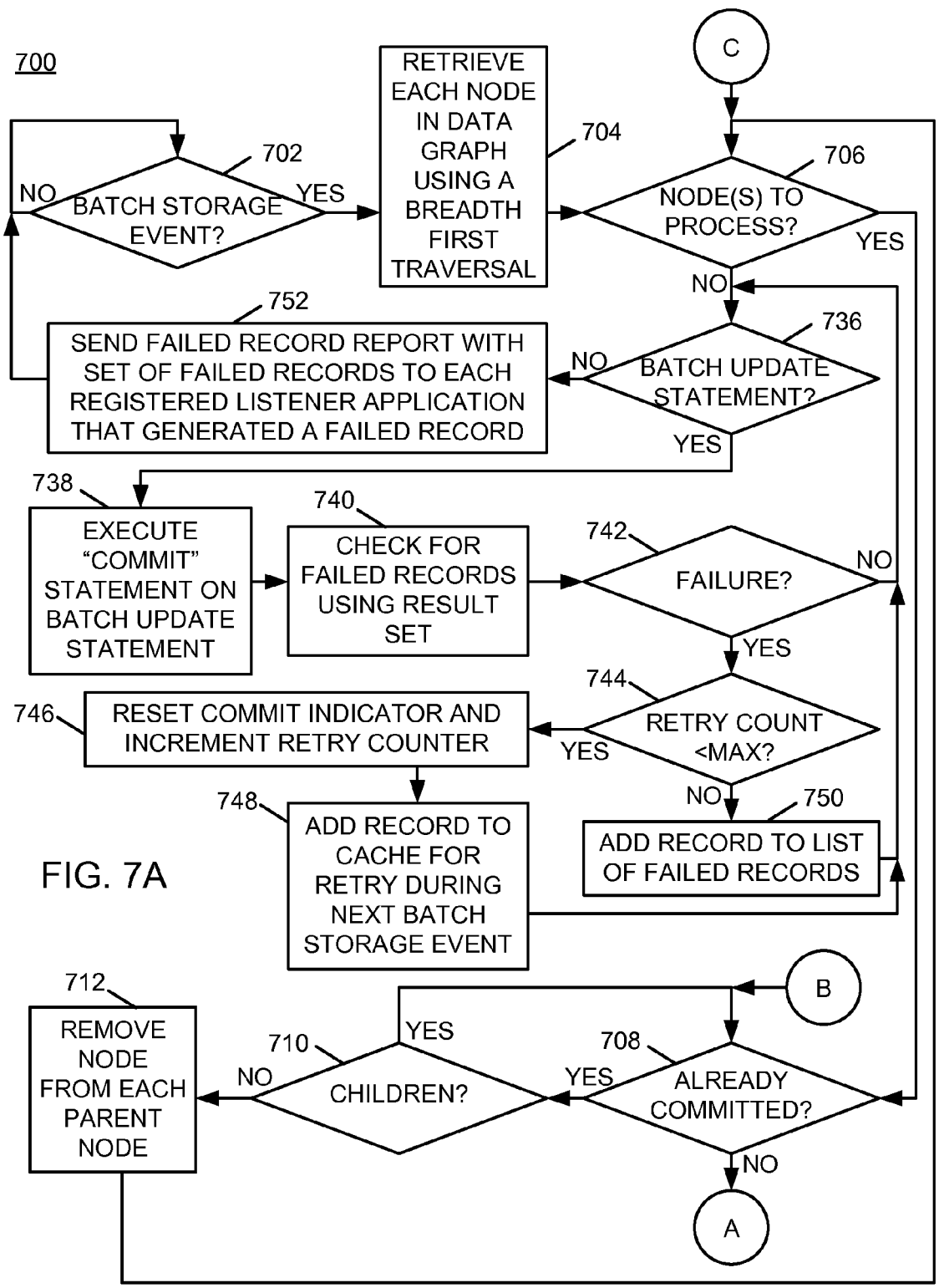
FIG. 7A is a flow chart of an example of initial processing of an implementation of process for automated write behind cache with M-to-N referential integrity for persisting records to a database according to an embodiment of the present subject matter.
Figure 7B:
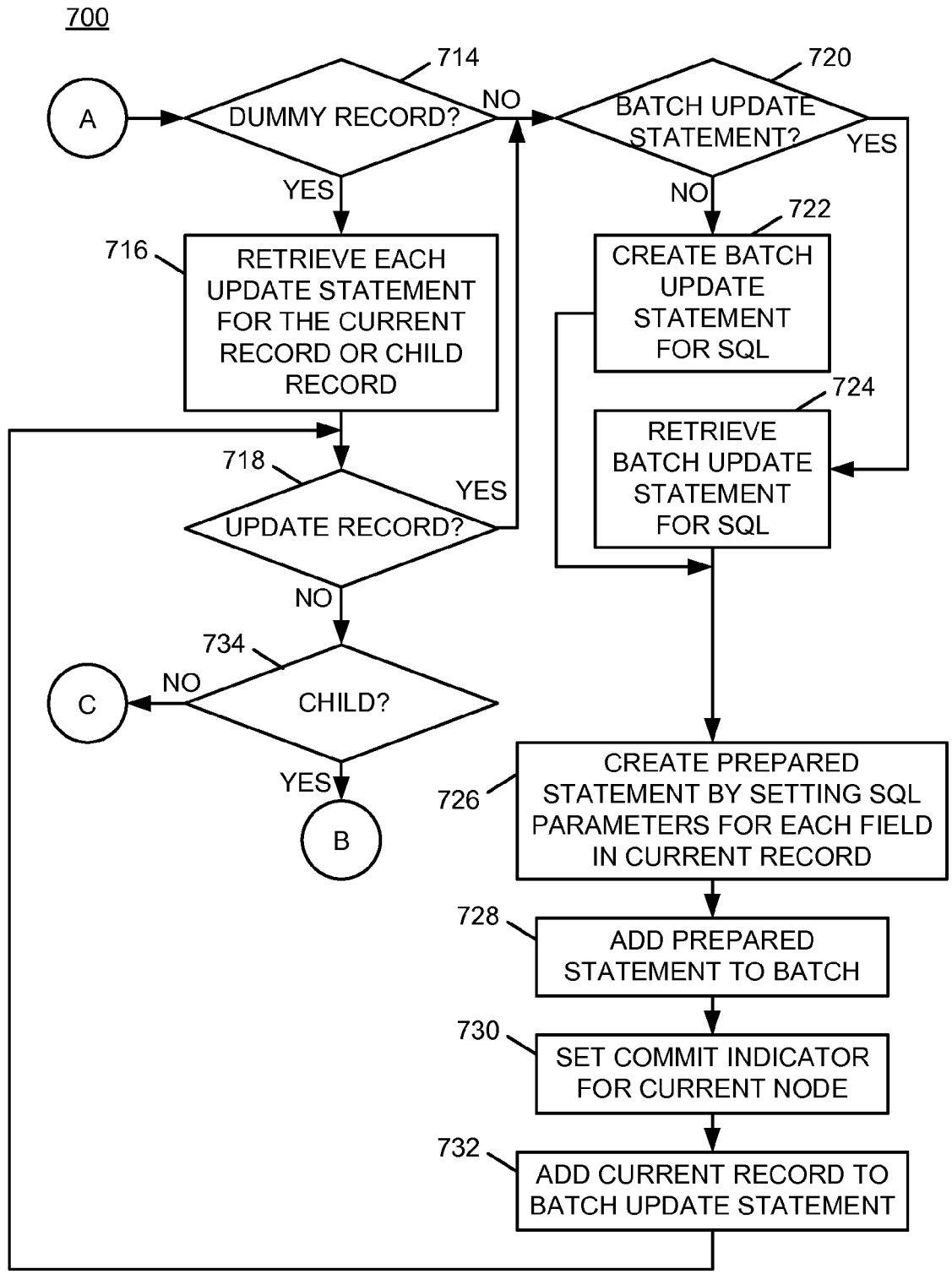
FIG. 7B is a flow chart of an example of additional processing of an implementation of process for automated write behind cache with M-to-N referential integrity for persisting records to a database according to an embodiment of the present subject matter.

FIGS. 7A-7B illustrate a flow chart of an example of an implementation of process 700 for automated write behind cache with M-to-N referential integrity for persisting records to a database, such as the database 112. FIG. 7A illustrates initial processing within the process 700. At decision point 702, the process 700 makes a determination as to whether a batch storage event has occurred. As described above, a batch storage event may be triggered in response to expiration of a batch interval (a batch interval time expiration event) or in response to a batch count being reached (a batch record count being reached event). In response to determining that a batch storage event has occurred, the process 700 retrieves each node in the data graph using a breadth first traversal at block 704. Breadth first traversal may include traversing a bidirectional directed graph, as described above. At decision point 706, the process 700 makes a determination as to whether there are any nodes to process in response to retrieving each node in the data graph at block 704. At decision point 706, the process 700 begins iterative processing for each node retrieved. As such, the process 700 makes a determination at decision point 706 as to whether one or more nodes (e.g., any additional nodes) were retrieved that are available for processing. It is understood that the first iteration will result in a determination that at least one node is available for processing if at least one node is retrieved via the processing of block 704. Subsequent iterations may result in a positive determination that more nodes are available for processing or may result in a negative determination that no additional nodes are available for processing based upon the number of nodes retrieved via the processing of block 704.

In response to determining that there is at least one node to process at decision point 706, the process 700 makes a determination at decision point 708 as to whether a first of the retrieved nodes is already committed to the database 112. In response to determining that the retrieved node is already committed to the database 112, the process 700 begins recursive processing for any children nodes of the current node. As such, at decision point 710, the process 700 makes a determination as to whether there are any children nodes associated with the current node. In response to determining that there is at least one child node of the current node, the process 700 returns to decision point 708 to make a determination as to whether the child node has already been committed to the database 112. This processing iterates recursively for all child nodes. A description of processing associated with the determination that any node has not been committed to the database 112 will be described below.

Returning to the description of decision point 710, in response to determining that there are no children nodes, or additional children nodes, associated with the current node, the process 700 removes the current node from each parent node at block 712 and returns to decision point 706 to make a determination as to whether any additional nodes were retrieved that need to be processed. The process 700 iterates in this manner until all nodes have been processed. A description of processing in response to a determination at decision point 706 that all nodes have been processed will be described in more detail below after processing for commitment of nodes to the database 112 has been described.

Returning to the description of decision point 708, in response to determining that any current node or child node has not already been committed to the database 112, the process 700 transitions to the processing shown and described in association with FIG. 7B.

FIG. 7B illustrates additional processing associated with the process 700 for automated write behind cache with M-to-N referential integrity for persisting records to a database. At decision point 714, the process 700 makes a determination as to whether the current record or current child record that has not been committed to the database 112 has a dummy record. As such, the process 700 identifies each data record that needs to be committed to the database 112 that does not include any foreign key reference that reference a non-existent data record. In response to determining that the current record or current child record that has not yet been committed to the database 112 is a dummy record, the process 700 retrieves each update statement for the current record or child record at block 716.

At decision point 718, the process 700 makes a determination as to whether any update records were retrieved in association with the current record or current child record. In response to determining at decision point 718 that at least one update record has been retrieved, or upon determining at decision point 714 that the current record or current child record that has not been committed to the database 112 does not have a dummy record, the process 700 begins iterative processing for each update record retrieved.

At decision point 720, the process 700 makes a determination as to whether a batch update statement for the SQL of the current record exists. In response to determining that a batch update record statement for the SQL of the current record does not exist, the process 700 creates the batch update statement for the SQL at block 722. In response to determining at decision point 720 that the batch update statement for the SQL already exists, the process 700 retrieves the batch update statement for the SQL at block 724. At block 726, the process 700 creates a prepared statement by setting SQL parameters for each field in the current record. At block 728, the process 700 adds the prepared statement to the batch. This processing may also include removing each identified current data record from the bidirectional directed graph. Further, adding the prepared statement to the batch may include instantiating a batch update data structure in response to identification of a first instance of each record type associated with each removed data record, and adding each removed data record to the batch update data structure associated with the record type associated with each removed data record.

At block 730, the process 700 sets a commit indicator for the current node. At block 732, the process 700 adds the current record to the batch update statement. The process 700 returns to decision point 718 to determine whether any additional update records were retrieved and iteratively processes each update record as described above. In response to determining at decision point 718 that all retrieved update records have been processed, the process 700 makes a determination at decision point 734 as to whether any child records are associated with the current record or current child record. In response to determining that at least one child record exists, the process 700 returns to the processing described in association with FIG. 7A at decision point 708 and iterates as described above to process each child record.

In response to determining that there is no child record of the current record or current child record, the process 700 returns to the processing described in association with FIG. 7A at decision point 706 and iterates as described above to process each additional node retrieved at block 704.

Returning to the description of decision point 706 within FIG. 7A, in response to determining that either no node was retrieved in block 704, or that all nodes have been processed, the process 700 begins iterative processing for each batch update statement at decision point 736. As such, process 700 begins iteratively attempting to persist each data record and each data record update of each batch update data structure to the database 112. Accordingly, at decision point 736, the process 700 makes a determination as to whether at least one batch update statement is available for processing. In response to determining that at least one batch update statement exists, the process 700 executes a "commit" statement on the current batch update statement at block 738. As such, the process 700 persists to the database 112, via the batch storage operation, each of the cached batch of data records that do not include a foreign key reference that references a non-existent data record by executing each SQL statement to the database 112. At block 740, the process 700 checks for failed records using a result set of the commit statement. At decision point 742, the process 700 makes a determination as to whether there was a failure associated with the commit operation of the current batch update statement. In response to determining that no failure occurred in association with the commit operation of the current batch update statement, the process 700 may remove, for each persisted data record and each data record update, the data record and the data record update from the batch update data structure associated with each record type associated with each persisted record and returns to decision point 736 and iterates to process additional batch update statements.

When a determination is made at decision point 742 that a failure did occur in association with the commit operation of the current batch update statement, the process 700 makes a determination at decision point 744 as to whether a retry count is less than a maximum retry count. As such, the process 700 determines whether the retry counter associated with any record has reached a threshold number of repeated failed persistence attempts to the database 112. In response to determining that the retry count for the current record is less than the maximum retry count, the process 700 resets the commit indicator associated with the current record and increments a retry counter associated with each record added to the bidirectional directed graph at block 746. At block 748, the process 700 adds the record back to the cache 110 for retry during the next batch storage event. Adding the record to the cache 110 may include adding the record to the bidirectional directed graph. The process 700 then returns to decision point 736 and iterates as described above for each additional batch update statement. It should be understood that the process 700 iteratively attempts to persist each record that includes a failed persistence to the database 112 in response to at least one subsequent batch database storage event.

Returning to the description of decision point 744, in response to determining that the retry count is not less than the maximum retry count for the current record, the process 700 adds the current record to the list of failed records at block 750. The process 700 then returns to decision point 736 and iterates as described above for each additional batch update statement.

Returning to the description of decision point 736, in response to determining that all available batch update statements have been processed, the process 700 sends a failed record report with a set of failed records to each registered listener application that generated a failed record at block 752. As such, the process 700 notifies, for each record determined to have reached the threshold number of repeated failed persistence attempts, an application that generated the record of the repeated failed persistence attempts associated with the record. Again, this notification may be based upon the application being registered as a listener application to receive notifications of failed database write events. The process 700 then returns to decision point 702 to await a new batch storage event.

As such, the process 700 detects batch storage events based upon a batch interval or a batch count and retrieves each node in a data graph of cached records using a breadth first traversal. The process 700 iteratively processes each retrieved node and iteratively retrieves or creates batch update statements for the SQL associated with each record that has not been committed to a database. The process 700 executes each batch update statement to commit each record that has not been committed to the database. Any records associated with the failed commit operation are added back to the cache for retry during the next batch storage event and any failed records are reported to registered listener applications that generated the respective failed records. Accordingly, the processing described herein offloads multi-threaded applications and allows these applications to perform record operations in association with the cache without concern for the sequence of operations. The cached processing described herein operates to ensure that records are committed to the database in the proper order and, thereby, may reduce complexity of the multi-threaded applications and may reduce database errors.

As described above in association with FIG. 1 through FIG. 7B, the example systems and processes provide write behind cache with M-to-N referential integrity. Many other variations and additional activities associated with write behind cache with M-to-N referential integrity are possible and all are considered within the scope of the present subject matter.

Those skilled in the art will recognize, upon consideration of the above teachings, that certain of the above examples are based upon use of a programmed processor, such as the CPU 200. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
    caching, via a processor, a batch of data records generated by at least one application for persistent storage, where at least one of the batch of data records comprises at least one foreign key reference that each references one non-existent data record;
    where caching, via the processor, the batch of data records generated by the at least one application for persistent storage comprises:
    maintaining a bidirectional directed graph with each data record represented as a node within the bidirectional directed graph, where each vertex in the bidirectional directed graph other than a root node represents one of a plurality of parent records and one of a plurality of child records to be persisted to the database, and each edge in the bidirectional directed graph represents a foreign key directional relationship from one child record to one associated parent record;
    determining that one of a plurality of batch database storage events has occurred;
    iteratively determining, in response to the one of the plurality of batch database storage events, which of the at least one of the batch of data records do not comprise the at least one foreign key reference that each references the one non-existent data record; and
    persisting to a database, via a batch storage operation, each of the cached batch of data records that do not comprise the at least one foreign key reference that each references the one non-existent data record.

2. The method of claim 1, where caching, via the processor, the batch of data records generated by the at least one application for persistent storage comprises:
    creating a dummy record in the cached batch of data records for each of the at least one foreign key reference that each references the one non-existent data record; and
    further comprising removing each dummy record from the cache in response to caching an existing data record with a primary key that matches each dummy record.

3. The method of claim 1, where iteratively determining, in response to the one of the plurality of batch database storage events, which of the at least one of the batch of data records do not comprise the at least one foreign key reference that each references the one non-existent data record comprises:
    traversing the bidirectional directed graph;

identifying each data record that needs to be committed to the database that does not comprise the at least one foreign key reference that each references the one non-existent data record;

removing each identified data record from the bidirectional directed graph;

instantiating a batch update data structure in response to identification of a first instance of each record type associated with each removed data record; and adding each removed data record to the batch update data structure associated with the record type associated with each removed data record.

4. The method of claim 3, where persisting to the database, via the batch storage operation, each of the cached batch of data records that do not comprise the at least one foreign key reference that each references the one non-existent data record comprises:

iteratively attempting to persist each data record of each batch update data structure to the database; and further comprising:

removing, for each persisted data record, the data record from the batch update data structure associated with each record type associated with each persisted record; and for each record comprising a failed persistence to the database:

adding the record to the bidirectional directed graph;

incrementing a retry counter associated with each record added to the bidirectional directed graph; and iteratively attempting to persist each record comprising a failed persistence to the database in response to at least one subsequent batch database storage event.

5. The method of claim 4, further comprising:

determining whether the retry counter associated with any record has reached a threshold number of repeated failed persistence attempts to the database; and notifying, for each record determined to comprise the retry counter that has reached the threshold number of repeated failed persistence attempts, an application that generated the record that has reached the threshold number of repeated failed persistence attempts.

6. The method of claim 1, where the batch database storage event comprises one of a batch record count being reached event and a batch interval time expiration event.

7. The method of claim 1, where:

each data record of the batch of data records generated by the at least one application comprises an associated structured query language (SQL) statement generated by the at least one application that generated each data record; and persisting to the database, via the batch storage operation, each of the cached batch of data records that do not comprise the at least one foreign key reference that each references the one non-existent data record comprises executing each SQL statement to the database.

* * * * *